United States Patent
Sun et al.

(10) Patent No.: US 11,188,518 B2
(45) Date of Patent: Nov. 30, 2021

(54) METHOD AND APPARATUS FOR GENERATING FAULT DIAGNOSIS INFORMATION BASE OF NUMERICAL CONTROL MACHINE TOOL

(71) Applicant: Siemens Aktiengesellschaft, Munich (DE)

(72) Inventors: Qi Sun, Beijing (CN); Yunhua Fu, Princeton, NJ (US); Shun Jie Fan, Beijing (CN); Armin Roux, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/651,476

(22) PCT Filed: Sep. 30, 2017

(86) PCT No.: PCT/CN2017/105014
§ 371 (c)(1),
(2) Date: Mar. 27, 2020

(87) PCT Pub. No.: WO2019/061499
PCT Pub. Date: Apr. 4, 2019

(65) Prior Publication Data
US 2020/0265033 A1    Aug. 20, 2020

(51) Int. Cl.
*G06F 7/00*    (2006.01)
*G06F 16/23*    (2019.01)
(Continued)

(52) U.S. Cl.
CPC ..... *G06F 16/2365* (2019.01); *G05B 23/0259* (2013.01); *G06F 16/2379* (2019.01); *G06N 5/02* (2013.01); *G05B 2219/33099* (2013.01)

(58) Field of Classification Search
CPC ............. G06F 16/2365; G06F 16/2379; G05B 23/0259; G05B 2219/33099; G06N 5/02
(Continued)

(56) References Cited

U.S. PATENT DOCUMENTS

2017/0031329 A1*   2/2017   Inagaki .................... B25J 9/163
2017/0131710 A1    5/2017   Chen et al.

FOREIGN PATENT DOCUMENTS

CN    101770219 A    7/2010
CN    102736562 A    10/2012
(Continued)

OTHER PUBLICATIONS

International Search Report PCT/ISA/210 for International Application No. PCT/CN2017/105014 dated May 10, 2018.
(Continued)

*Primary Examiner* — Isaac M Woo
(74) *Attorney, Agent, or Firm* — Harness, Dickey & Pierce, P.L.C.

(57) ABSTRACT

The present invention related to the technical field of industrial automation, in particular to a method and apparatus for generating a fault diagnosis database of a CNC machine tool, intended to conveniently provide comprehensive fault diagnosis information. The method comprises: setting a fault condition of the CNC machine tool; running a simulation model of the CNC machine tool under each set fault condition to generate fault, and recording a fault phenomenon of the fault; backtracking a possible fault generating each fault phenomenon, to establish an association between the fault phenomenon and a possible fault generating the fault phenomenon; generating a fault diagnosis database of the CNC machine tool according to the association established. Due to the fact that what is being run is a simulation model of the CNC machine tool, various fault conditions can be conve-
(Continued)

niently set. The fault diagnosis database established by the method has the advantage of comprehensive coverage of fault situations and abundant fault diagnosis information. The result of performing fault diagnosis on the basis of such a fault diagnosis database is more accurate.

12 Claims, 5 Drawing Sheets (51) Int. Cl.
  *G05B 23/02* (2006.01)
  *G06N 5/02* (2006.01)
(58) Field of Classification Search
  USPC .................................................. 707/600–899
  See application file for complete search history.

(56) References Cited

FOREIGN PATENT DOCUMENTS

| | | |
|---|---|---|
| CN | 102937798 A | 2/2013 |
| CN | 106528723 A | 3/2017 |
| JP | 2017068678 A | 4/2017 |

OTHER PUBLICATIONS

Written Opinion of the International Searching Authority PCT/ISA/237 for International Application No. PCT/CN2017/105014 dated May 30, 2018.
International Search Report and Written Opinion dated May 30, 2018.
Manivannan, S. et al:"Towards a Realtime Knowledge-Based Simulation System for Diagnosing Machine Tool Failure"; Proceedings of the Winter Simulation Conference. New Orleans; Dec. 9-12, 1990; New York; IEEE; vol. CONF. 22; Dec. 9, 1990; pp. 603-608; XP000279721.
Augustine, Manu et al:"An Approach to Capture System Interaction Failures of a Complex System"; 2011 IEEE; Jan. 24, 2011; pp. 1-6; XP031943185.
Xiaoli, Xu, et al., "Research on Data Acquisition and Database-Building Technology Based on High-end CNC Machine Tool," Communicaion Software and Networks, 2011 IEEE 3$^{rd}$ International Conference, pp. 135-138, May 27, 2011.
Extended European Search Report dated Mar. 4, 2021.

* cited by examiner

METHOD AND APPARATUS FOR GENERATING FAULT DIAGNOSIS INFORMATION BASE OF NUMERICAL CONTROL MACHINE TOOL

PRIORITY STATEMENT

This application is the national phase under 35 U.S.C. § 371 of PCT International Application No. PCT/CN2017/105014 which has an International filing date of Sep. 30, 2017, which designated the United States of America, the entire contents of which are hereby incorporated herein by reference.

FIELD

The present application generally relates to the technical field of industrial automation, in particular to a method and apparatus for generating a fault diagnosis database of a CNC machine tool.

BACKGROUND

Computer Numerical Control machine tools (CNC machine tools) are key equipment in manufacturing industrial systems, being a type of automated machine tool controlled by a computer program, and having advantages such as high component machining precision and a high degree of automation. The usability of such a tool is of vital importance to the stable operation of the manufacturing industrial system to which it belongs.

Figure 1:
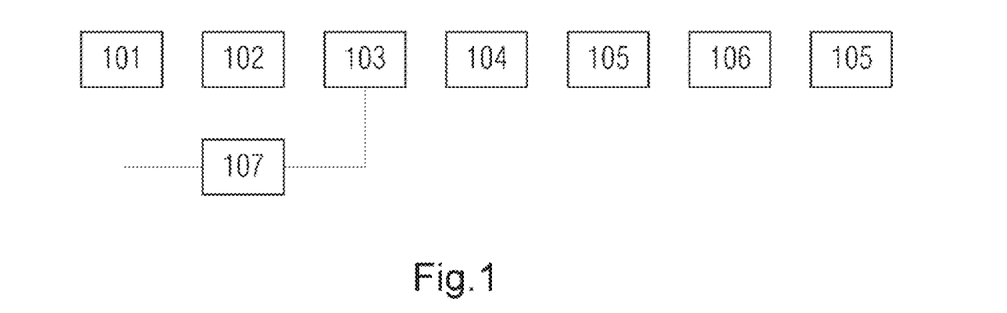
FIG. 1 is a structural block diagram of a feeding system of a CNC machine tool.

In general, the structure of a CNC machine tool is relatively complex. For simplicity of illustration, FIG. 1 shows a structural block diagram of a feeding system of a CNC machine tool; the feeding system can serve as an example of a CNC machine tool. As shown in FIG. 1, the feeding system of the CNC machine tool 10 comprises a programmable logical controller (PLC) 101, a servo drive 102, a servo motor 103, a coupling 104, two bearings 105, a ball screw pair 106 and an encoder 107. Under the control of a computer program in the encoder 107, the PLC 101 drives the servo motor 103 to rotate via the servo drive 102, and the servo motor 103 then drives a nut in the ball screw pair 103 to rotate via the coupling 104 and the bearings 105.

Clearly, the structure of a CNC machine tool is complex, and involves not only hardware connections but also software program control.

SUMMARY

The inventors have discovered faults occur in an irregular and indeterminate manner, and diagnosis is relatively difficult. Fault diagnosis methods for CNC machine tools that are in common use at the present time rely on historical fault records and expert experience, and struggle to cover comprehensive fault diagnosis information, often being unable to attain an accurate fault diagnosis result.

In view of the above, at least one embodiment provides a method and apparatus for generating a fault diagnosis database for a CNC machine tool, intended to conveniently provide comprehensive fault diagnosis information, for diagnosing a fault of a CNC machine tool accurately and effectively.

At least one example embodiment provides a method for generating a fault diagnosis database of a CNC (Computer Numerical Control) machine tool. The method includes setting at least one fault condition of the CNC machine tool, running a first simulation model of the CNC machine tool under each set fault condition respectively to generate a fault, and recording at least one fault phenomenon of the fault, for each fault phenomenon recorded, backtracking at least one possible fault generating the fault phenomenon, to establish an association between the fault phenomenon and at least one possible fault generating the fault phenomenon and generating a first fault diagnosis database of the CNC machine tool according to the at least one association established.

At least one example embodiment provides an apparatus for generating a fault diagnosis database of a CNC machine tool. The apparatus includes at least one memory for storing computer readable instructions; and at least one processor, configured to execute the computer readable instructions to cause the apparatus to set at least one fault condition of the CNC machine tool, run a first simulation model of the CNC machine tool under each set fault condition respectively to generate a fault, and recording at least one fault phenomenon of the fault, for each fault phenomenon recorded, backtrack at least one possible fault generating the fault phenomenon, to establish an association between the fault phenomenon and at least one possible fault generating the fault phenomenon, and generate a first fault diagnosis database of the CNC machine tool according to the at least one association established.

At least one example embodiment provides a machine-readable medium having a machine-readable instruction stored thereon which, when executed by at least one processor, causes the at least one processor to perform setting at least one fault condition of the CNC machine tool, running a first simulation model of the CNC machine tool under each set fault condition respectively to generate a fault, and recording at least one fault phenomenon of the fault, for each fault phenomenon recorded, backtracking at least one possible fault generating the fault phenomenon, to establish an association between the fault phenomenon and at least one possible fault generating the fault phenomenon, and generating a first fault diagnosis database of the CNC machine tool according to the at least one association established.

Description of reference numerals in the drawings
101: PLC
102: servo drive
103: servo motor
104: coupling
105: bearings
106: ball screw pair 107: encoder
10: CNC machine tool
S201: setting a fault condition S202: running a simulation model of a CNC machine tool
S203: backtracking a fault
S204: generating a fault diagnosis database
203, 203(1)-203(m), 203(11)-203(q1), 203(12)-203(1h), 203(3k), 203 (qs): fault
204, 204(1)-204 (n): fault phenomenon
202: fault condition
201: fault diagnosis database
205: semantic description of fault phenomenon
206: semantic description of fault 301: setting module
302: running module
303: generating module
304: at least one memory
305: at least one processor
306: user interface
307: communication interface
30: apparatus for generating fault diagnosis database
401: user interface module
402: diagnosis module
40: fault diagnosis apparatus
100: fault diagnosis system
200: user terminal
207: simulation model of CNC machine tool 10

DETAILED DESCRIPTION OF EXAMPLE EMBODIMENTS

In a first embodiment, a method for generating a fault diagnosis database for a CNC machine tool is provided, the method comprising: setting at least one fault condition of the CNC machine tool; running a first simulation model of the CNC machine tool under each set fault condition respectively in order to generate a fault, and recording at least one fault phenomenon of the fault; for each fault phenomenon recorded, backtracking at least one possible fault generating the fault phenomenon, in order to establish an association between the fault phenomenon and at least one possible fault generating the fault phenomenon; and generating a first fault diagnosis database of the CNC machine tool according to the at least one association established.

Due to the fact that what is being run is a simulation model of the CNC machine tool, various fault conditions can be conveniently set, in order to inject faults into the simulation model. The fault diagnosis database established by the method has the advantages of comprehensive coverage of fault situations and abundant fault diagnosis information. The result of performing fault diagnosis on the basis of such a fault diagnosis database is more accurate.

Optionally, the step of establishing the association between the fault phenomenon and the at least one possible fault generating the fault phenomenon, comprises: establishing a reverse fault propagation path of the fault phenomenon; the step of generating the first fault diagnosis database according to the at least one association established, comprises: generating a fault propagation model as the first fault diagnosis database according to the established reverse fault propagation path of the at least one fault phenomenon.

Optionally, the at least one fault condition satisfies one of the following situations:
the at least one fault condition involves all components of the CNC machine tool, and each of the at least one fault condition only involves one component of the CNC machine tool; and
the at least one fault condition involves all components of the CNC machine tool, and each of a portion of or all of the at least one fault condition involves at least two components of the CNC machine tool.

In order to achieve the object of comprehensive fault coverage, the various fault conditions which are set may involve all components of the CNC machine tool, in order to achieve the injection of faults for all components. Optionally, due to the fact that a fault is injected into a simulation model of the CNC machine tool, a fault condition can be set such that the fault condition involves multiple components of the CNC machine tool; in terms of implementation, this is more flexible than a conventional fault diagnosis database generated by relying on a historical fault record and expert experience, and fault coverage is more comprehensive.

Optionally, the method further comprises: setting a semantic description of each fault phenomenon and recording same in the first fault diagnosis database, and setting a semantic description of each fault and recording same in the first fault diagnosis database.

This makes it easier to determine, according to a semantic description of a fault phenomenon inputted by a user, a corresponding fault phenomenon during fault diagnosis, and in turn determine a possible fault from the fault phenomenon, and return to the user a semantic description of the fault that is determined. The usability of the fault diagnosis database is improved, so that it is easy for the user to understand and more user-friendly.

Optionally, in an embodiment, a second simulation model of the CNC machine tool is run under each of the at least one set fault condition respectively in order to generate a second fault diagnosis database; the second fault diagnosis database is used to correct the first fault diagnosis database.

Due to the fact that fault diagnosis databases are generated on the basis of different simulation models, and then one fault diagnosis database is used to correct another fault diagnosis database, the information in the databases generated is more comprehensive and more accurate.

In a second embodiment, an apparatus for generating a fault diagnosis database of a CNC machine tool is provided, comprising: a setting module, for setting at least one fault condition of the CNC machine tool; a running module, for running a simulation model of the CNC machine tool under each fault condition set by the setting module respectively in order to generate a fault, and recording at least one fault phenomenon of the fault; a generating module, for backtracking, for each fault phenomenon recorded by the running module, at least one possible fault generating the fault phenomenon, in order to establish an association between the fault phenomenon and at least one possible fault generating the fault phenomenon, and generating a first fault diagnosis database of the CNC machine tool according to the at least one association established.

Due to the fact that what is being run is a simulation model of the CNC machine tool, various fault conditions can be conveniently set, in order to inject faults into the simulation model. The fault diagnosis database established by the method has the advantages of comprehensive coverage of fault situations and abundant fault diagnosis information. The result of performing fault diagnosis on the basis of such a fault diagnosis database is more accurate.

Optionally, in an embodiment, when establishing the association between the fault phenomenon and the at least one possible fault generating the fault phenomenon, the running module is specifically used for: establishing a reverse fault propagation path of the fault phenomenon; when generating the first fault diagnosis database according to the at least one association established, the generating module is specifically used for: generating a fault propagation model as the first fault diagnosis database according to the established reverse fault propagation path of the at least one fault phenomenon.

Optionally, t in an embodiment, be setting module is specifically used for setting the at least one fault condition in order to satisfy one of the following situations:

the at least one fault condition involves all components of the CNC machine tool, and each of the at least one fault condition only involves one component of the CNC machine tool; and the at least one fault condition involves all components of the CNC machine tool, and each of a portion of or all of the at least one fault condition involves at least two components of the CNC machine tool.

In order to achieve the object of comprehensive fault coverage, the various fault conditions which are set may involve all components of the CNC machine tool, in order to achieve the injection of faults for all components. Optionally, in an embodiment, due to the fact that a fault is injected into a simulation model of the CNC machine tool, a fault condition can be set such that the fault condition involves multiple components of the CNC machine tool; in terms of implementation, this is more flexible than a conventional fault diagnosis database generated by relying on a historical fault record and expert experience, and fault coverage is more comprehensive.

Optionally, in an embodiment, the setting module is further used for: setting a semantic description of each fault phenomenon and recording same in the first fault diagnosis database, and setting a semantic description of each fault and recording same in the first fault diagnosis database.

This makes it easier to determine, according to a semantic description of a fault phenomenon inputted by a user, a corresponding fault phenomenon during fault diagnosis, and in turn determine a possible fault from the fault phenomenon, and return to the user a semantic description of the fault that is determined. The usability of the fault diagnosis database is improved, so that it is easy for the user to understand and more user-friendly.

Optionally, in an embodiment, the running module is further used for running a second simulation model of the CNC machine tool under each of the at least one fault condition set by the setting module respectively; the generating module is further used for generating a second fault diagnosis database according to a running result of the running module, and using the second fault diagnosis database to correct the first fault diagnosis database.

Due to the fact that fault diagnosis databases are generated on the basis of different simulation models, and then one fault diagnosis database is used to correct another fault diagnosis database, the information in the databases generated is more comprehensive and more accurate.

In a third embodiment, an apparatus for generating a fault diagnosis database of a CNC machine tool is provided, comprising: at least one memory, for storing a machine-readable program; at least one processor, for calling the machine-readable program, to perform the method provided in the first embodiment or any possible form of implementation of the first embodiment.

In a fourth embodiment, a fault diagnosis system of a CNC machine tool is provided, comprising:

an apparatus for generating a fault diagnosis database of the CNC machine tool, for setting at least one fault condition of the CNC machine tool; running a simulation model of the CNC machine tool under each set fault condition respectively in order to generate a fault, and recording at least one fault phenomenon of the fault; for each fault phenomenon recorded, backtracking at least one possible fault generating the fault phenomenon, in order to establish an association between the fault phenomenon and a possible fault generating the fault phenomenon; generating the fault diagnosis database according to the at least one association established; setting a semantic description of each fault phenomenon and recording same in the fault diagnosis database, and setting a semantic description of each fault and recording same in the fault diagnosis database; and a fault diagnosis apparatus, for receiving a semantic description of a first fault phenomenon inputted by a user, and obtaining a semantic description of all possible faults generating the first fault phenomenon on the basis of the fault diagnosis database and returning same to the user.

Due to the fact that what is being run is a simulation model of the CNC machine tool, various fault conditions can be conveniently set, in order to inject faults into the simulation model. The fault diagnosis database established by the method has the advantages of comprehensive coverage of fault situations and abundant fault diagnosis information. The result of performing fault diagnosis on the basis of such a fault diagnosis database is more accurate.

According to a semantic description of a fault phenomenon inputted by a user, a corresponding fault phenomenon is determined, a possible fault is then determined from the fault phenomenon, and a semantic description of the fault determined is returned to the user. The usability of the fault diagnosis database is improved, so that it is easy for the user to understand and more user-friendly.

Optionally, in an embodiment, the system is deployed in a cloud. The user can access the fault diagnosis system anywhere at any time to perform fault diagnosis. In a fifth embodiment, a machine-readable medium is provided, having a machine-readable instruction stored thereon which, when executed by at least one processor, causes the at least one processor to perform the method provided in the first embodiment or any possible form of the first embodiment.

As stated above, the structure of a CNC machine tool is complex; faults occur in an irregular and indeterminate manner, and diagnosis is relatively difficult. Fault diagnosis methods for CNC machine tools that are in common use at the present time rely on historical fault records and expert experience, and struggle to cover comprehensive fault diagnosis information, often being unable to attain an accurate fault diagnosis result.

In embodiments, when a fault diagnosis database is being generated, a simulation model of a CNC machine tool is run under different fault conditions respectively in order to generate a fault, a fault phenomenon is recorded, a fault generating the fault phenomenon is backtracked, an association between the fault phenomenon and the fault is established, and the fault diagnosis database is established according to the established association.

Due to the fact that what is being run is a simulation model of the CNC machine tool, various fault conditions can be conveniently set, in order to inject faults into the simulation model. The fault diagnosis database established by the method has the advantages of comprehensive coverage of fault situations and abundant fault diagnosis information. The result of performing fault diagnosis on the basis of such a fault diagnosis database is more accurate.

Optionally, in an embodiment, in order to achieve the object of comprehensive fault coverage, the various fault conditions which are set may involve all components of the CNC machine tool, in order to achieve the injection of faults for all components.

Optionally, in an embodiment, due to the fact that a fault is injected into a simulation model of the CNC machine tool, a fault condition can be set such that the fault condition involves multiple components of the CNC machine tool; in terms of implementation, this is more flexible than a conventional fault diagnosis database generated by relying on a historical fault record and expert experience, and fault coverage is more comprehensive.

Optionally, in an embodiment, a semantic description of each fault phenomenon and a semantic description of each fault may also be set, and recorded in the fault diagnosis database; this makes it easier to determine, according to a semantic description of a fault phenomenon inputted by a user, a corresponding fault phenomenon during fault diagnosis, and in turn determine a possible fault from the fault phenomenon, and return to the user a semantic description of the fault that is determined. The usability of the fault diagnosis database is improved, so that it is easy for the user to understand and more user-friendly.

The method and equipment provided in embodiments are explained in detail below in conjunction with the figures.

Figure 2:
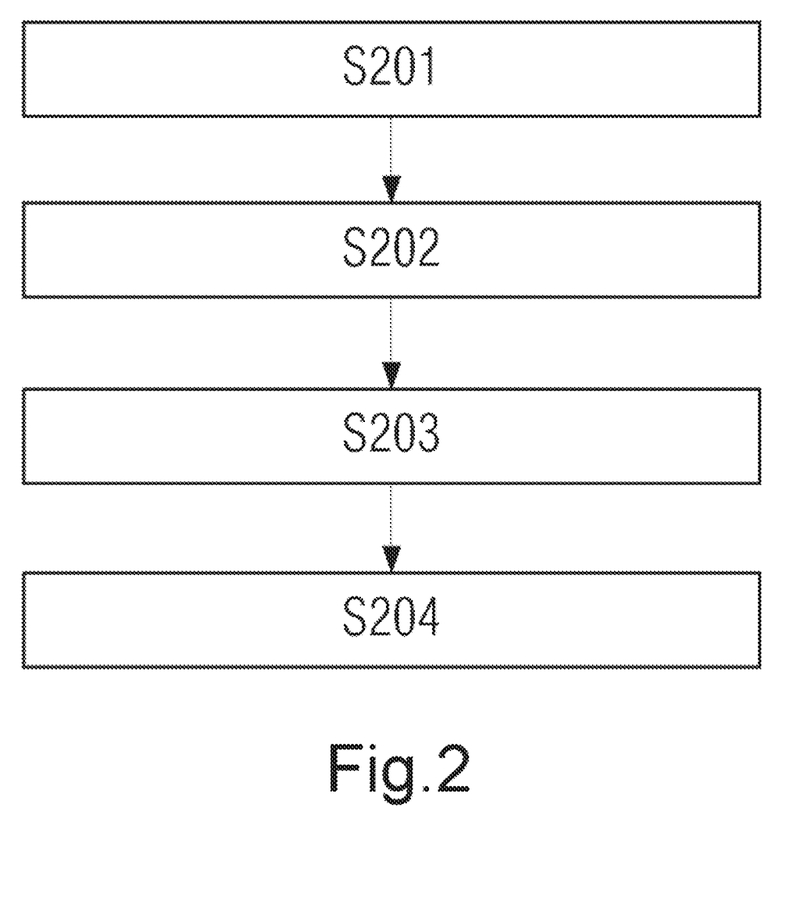
FIG. 2 is a flow chart of a method for generating a fault diagnosis database provided in at least one embodiment.

A method provided in at least one embodiment for generating a fault diagnosis database is presented first below. As shown in FIG. 2, the at least one embodiment may comprise the following steps:

S201: setting a fault condition.
S202: running a simulation model of a CNC machine tool.
S203: backtracking a fault.
S204: generating a fault diagnosis database.

In step S201, at least one fault condition 202 of the CNC machine tool 10 is set. For example: the condition that a current of the servo motor 103 of the CNC machine tool is 0, is set as a fault condition 202.

Optionally, in an embodiment, the at least one fault condition 202 may involve all components of the CNC machine tool 10, for example: the PLC 101, servo drive 102, servo motor 103, coupling 104, bearings 105, ball screw pair 106 and encoder 107 in FIG. 1. Thus all components of the CNC machine tool 10 can be traversed, and the faults generated are more comprehensive.

Optionally, in an embodiment, each fault condition 202 that is set only involves one component of the CNC machine tool 10.

Optionally, in an embodiment, each of a portion of or all of the at least one fault condition 202 set involves at least two components of the CNC machine tool 10. For example: 100 fault conditions 202 are set in total, wherein each of 50 fault conditions 202 involves at least two components of the CNC machine tool 10. Thus various real fault scenarios can be simulated; in terms of implementation, this is more flexible than a conventional fault diagnosis database generated by relying on a historical fault record and expert experience, and fault coverage is more comprehensive.

Optionally, in an embodiment, when the fault condition 202 is being set, all possible fault conditions may be traversed, in order to simulate all faults which might occur.

In step S202, under each fault condition 202 that is set, a simulation model 207 of the CNC machine tool 10 is respectively run in order to generate a fault 203, and at least one fault phenomenon 204 of the fault 203 is recorded. One fault might have multiple fault phenomena. In step S202, all fault phenomena 204 of the fault 203 or a portion of fault phenomena 204 of the fault 203 may be recorded.

For example: the fault condition 202 is set to be: the current of the servo motor 103 is 0. The simulation model 207 of the CNC machine tool 10 is run under this fault condition 202, and the fault 203 that is generated is: the servo motor 103 has no current output. The fault phenomenon 204 of this fault is: a rotation speed of the nut in the ball screw pair 106 falls to 0. In step S202, the fault phenomenon of the fault of the servo motor 103 is recorded: the rotation speed of the nut in the ball screw pair 106 falls to 0.

In step S203, for each fault phenomenon 204 that is recorded, at least one possible fault 203 generating the fault phenomenon 204 is backtracked, to establish an association between the fault phenomenon 204 and at least one possible fault 203 generating the fault phenomenon 204.

Figure 3:
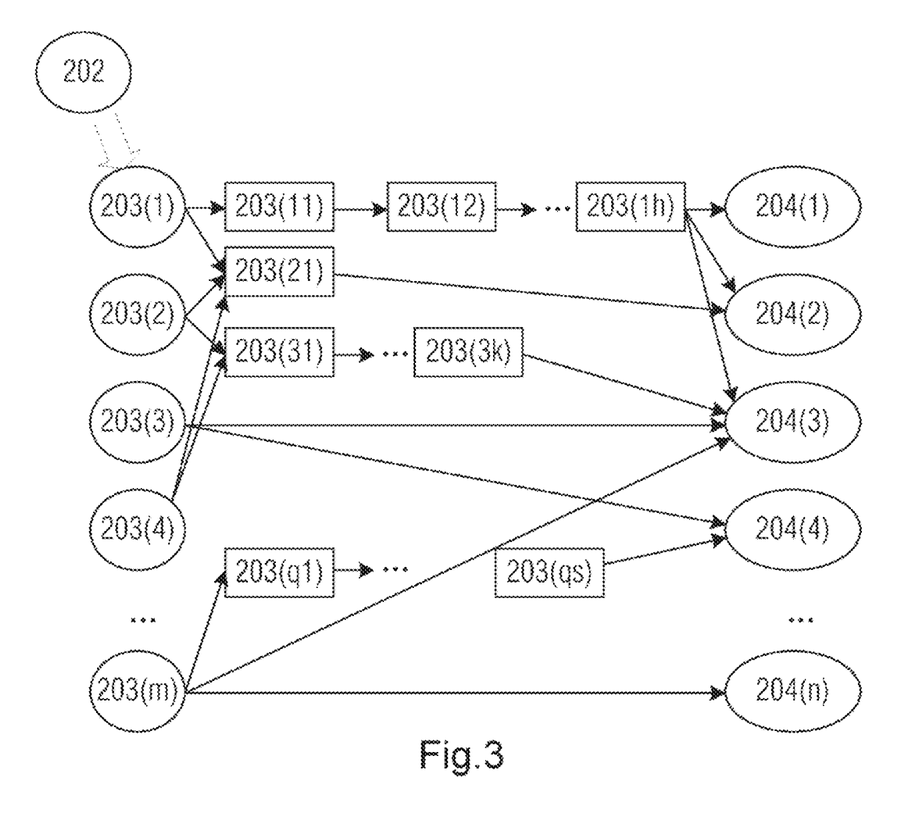
FIG. 3 is a schematic diagram of a fault diagnosis database generated in at least one embodiment.

All possible faults 203 generating the fault phenomenon 204, or a portion of possible faults 203 generating the fault phenomenon 204, may be backtracked. The association established between the fault phenomenon 204 and the fault 203 may be as shown in FIG. 3; for fault phenomenon 204(2), the fault phenomenon 204 may be generated by fault 203(1h), fault 203(1h) may be directly or indirectly caused by fault 203(12), fault 203 (12) is caused by fault 203 (11), and fault 203 (11) is caused by fault 203(1). In addition, fault phenomenon 204(2) might also be generated by fault 203 (21); fault 203(21) may be caused by fault 203(1), fault 203(2) or fault 203(4).

In step S204, a fault diagnosis database 201 of the CNC machine tool 10 is generated according to at least one association established in step S203.

Optionally, in an embodiment, the fault diagnosis database 201 of the CNC machine tool 10 may be generated according to all of, or a portion of, the associations established. The fault diagnosis database 201 generated may be implemented in various ways.

For example: a fault propagation model as shown in FIG. 3. Here, 202 is the injected fault condition. 203(1)-203(m) are m faults, wherein m is a positive integer. One fault might trigger another fault; in FIGS. 3, 203(11)-203(q1), 203(12)-203(1h), 203(3k), 203(qs), and 203(11)-203(q1) are faults triggered by one or more of the m faults 203(1)-203(m), wherein q, h, k and s are positive integers. 204(1)-204(n) are n fault phenomena, wherein n is a positive integer. A process from one fault phenomenon 204 to one fault 203 is called a reverse fault propagation path of the fault phenomenon 204. For example: a reverse fault propagation path from fault phenomenon 204(2) to fault 203(1) as mentioned above may be: 204(2)->203(21)->203(2), indicating that fault phenomenon 204(2) is generated by fault 203(21), and fault 203(21) may be caused by fault 203(2). Thus, in the case where a fault propagation model is established, in step S203, the association established is a reverse fault propagation path of fault phenomenon 204, and in step S204, the fault propagation model is generated as the fault diagnosis database 201 according to the reverse fault propagation path established.

The fault diagnosis database 201 generated may also comprise a series of fault usage examples, for example: For fault phenomenon 204(2), four fault usage examples are included, specifically: A first fault usage example, 204(2)->203(21)->203(1), indicating that fault phenomenon 204(2) is generated by fault 203(21), and fault 203(21) may be caused by fault 203(1).

A second fault usage example, 204(2)->203(21)->203(2), indicating that fault phenomenon 204(2) is generated by fault 203(21), and fault 203(21) may be caused by fault 203(2).

A third fault usage example, 204(2)->203(21)->203(4), indicating that fault phenomenon 204(2) is generated by fault 203(21), and fault 203(21) may be caused by fault 203(4).

A fourth fault usage example, 204(2)->203(1h)->203(12)->203(11)->203(1), indicating that fault phenomenon 204(2) is generated by fault 203(1h), fault 203(1h) is caused by fault 203 (12), fault 203 (12) is caused by fault 203(11), and fault 203 (11) is caused by fault 203(1).

In addition, the fault diagnosis database 201 generated may also be represented as a fault tree; no further description of this is given here.

In addition, a semantic description 205 of each fault phenomenon 204 may also be set, and recorded in a first fault diagnosis database 201, and a semantic description 206 of each fault 203 may also be set, and recorded in the first fault diagnosis database 201. This makes it easier to determine, according to a semantic description of a fault phenomenon inputted by a user, a corresponding fault phenomenon during fault diagnosis, and in turn determine a possible fault from the fault phenomenon, and return to the user a semantic description of the fault that is determined. The usability of the fault diagnosis database is improved, so that it is easy for the user to understand and more user-friendly.

For example: a semantic description corresponding to the abovementioned fault 203, "the servo motor 103 has no current output", is "servo motor fault"; a semantic description corresponding to the abovementioned fault phenomenon 204, "the rotation speed of the nut in the ball screw pair 106 falls to 0", is "the nut in the ball screw pair 106 is not moving".

Optionally, in an embodiment, it is also possible to run another simulation model 207 of the CNC machine tool 10 under each of the at least one fault condition 202 set in step S201 respectively in order to generate a fault diagnosis database 201. Since different simulation models 207 give different simulation results for one CNC machine tool 10, the information contained in fault diagnosis databases 201 generated using different simulation models 207 is not completely the same, and mutual correction is possible in order to generate a fault diagnosis database 201 having comprehensive and accurate information.

The fault diagnosis database 201 generated may be organized and presented as Big Data. It may also be deployed in a cloud, facilitating the provision of abundant and accurate fault information to an apparatus performing fault diagnosis.

The fault in embodiments may be regarded as being a fault that has occurred in one component itself or a number of components themselves, not a fault triggered by a fault in another component. Taking as an example the feeding system of the CNC machine tool 10 mentioned above, in normal circumstances, under the control of the computer program in the encoder, the PLC drives the servo motor to rotate via the servo drive, and the servo motor then drives the nut in the ball screw pair to rotate via the coupling and the bearings. The fault phenomenon of a fault occurring at the present time is that the rotation speed of the nut in the ball screw pair falls to 0. The fundamental cause of this fault phenomenon is a servo motor fault. This is because a servo motor fault will cause the bearings to stop rotating, and it will not be possible to drive the nut in the ball screw pair to rotate if the bearings stop moving. However, this fault phenomenon is not caused by a bearing fault; the fundamental cause thereof, i.e. the fault which has actually occurred, is a servo motor fault. If no fault has occurred in the servo motor, but a mechanical fault has occurred in the bearings and rotation is consequently impossible, then the fault phenomenon is also that the rotation speed of the nut in the ball screw pair falls to 0, but the fundamental cause of the fault is a bearing fault, not a servo motor fault.

Thus, in this sense, the fault in embodiments may also be called the fundamental cause of a specific fault which occurs in a CNC machine tool.

Figure 4:
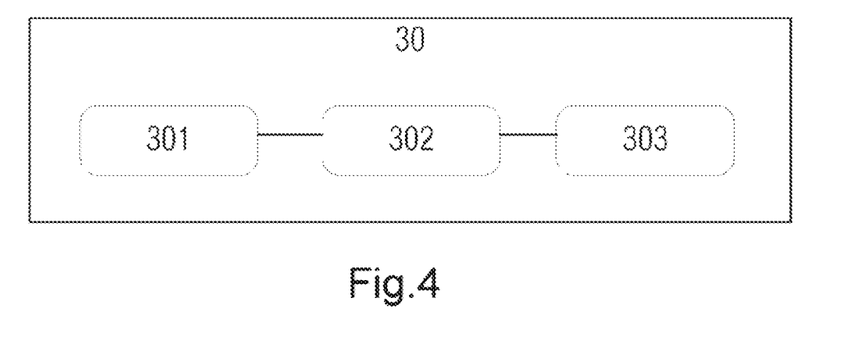
FIG. 4 is a structural schematic diagram of an apparatus for generating a fault diagnosis database provided in at least one embodiment.

FIG. 4 is a structural schematic diagram of an apparatus provided in at least one embodiment for generating a fault diagnosis database. As shown in FIG. 4, the apparatus 30 may comprise:

a setting module 301, for setting at least one fault condition 202 of the CNC machine tool 10;

a running module 302, for running a simulation model 207 of the CNC machine tool 10 under each fault condition 202 set by the setting module 301 respectively in order to generate a fault 203, and recording at least one fault phenomenon 204 of the fault 203;

a generating module 303, for backtracking, for each fault phenomenon 204 recorded by the running module 302, at least one possible fault 203 generating the fault phenomenon 204, in order to establish an association between the fault phenomenon 204 and at least one possible fault 203 generating the fault phenomenon 204, and generating a first fault diagnosis database 201 of the CNC machine tool 10 according to at least one association established.

Optionally, in an embodiment, when establishing the association between the fault phenomenon 204 and the at least one possible fault 203 generating the fault phenomenon 204, the running module 302 is specifically used for: establishing a reverse fault propagation path of the fault phenomenon 204; when generating the first fault diagnosis database 201 according to the at least one association established, the generating module 303 is specifically used for: generating a fault propagation model as the first fault diagnosis database 201 according to the established reverse fault propagation path of the at least one fault phenomenon 204.

Optionally, in an embodiment, the setting module 301 is specifically used for setting at least one fault condition 202, in order to satisfy one of the following situations: the at least one fault condition 202 involves all components of the CNC machine tool, and each of the at least one fault condition 202 only involves one component of the CNC machine tool 10; the at least one fault condition 202 involves all components of the CNC machine tool, and each of a portion of or all of the at least one fault condition 202 involves at least two components of the CNC machine tool 10.

Optionally, in an embodiment, the setting module 301 is further used for: setting a semantic description 205 of each fault phenomenon 204 and recording same in a first fault diagnosis database 201, and setting a semantic description 206 of each fault 203 and recording same in the first fault diagnosis database 201.

Optionally, in an embodiment, the running module 302 is further used for running a second simulation model 207 of the CNC machine tool 10 under each of the at least one fault condition 202 set by the setting module 301 respectively; the generating module 303 is further used for generating a second fault diagnosis database 201 according to a running result of the running module 302, and using the second fault diagnosis database 201 to correct the first fault diagnosis database 201.

The apparatus 30 may be used to perform the method shown in FIG. 2; for other optional forms of implementation of the apparatus 30, the description in the method shown in FIG. 2 may be referred to.

The setting module 301 is used for setting the fault condition 202, and optionally, in an embodiment, may also set a semantic description of the fault 203 and a semantic description of the fault phenomenon 204 and record same in the fault diagnosis database 201 generated. In addition, the setting module 301 may also be used to perform other setting operations, select different simulation models 207, set the size and capacity of the fault diagnosis database, etc.

The user of the running module 302 runs each simulation model 207 under each fault condition 202 set by the setting module 301 and records the fault phenomenon 204.

The generating module (303) is used for establishing the fault diagnosis database 201, to record the association between the fault phenomenon 204 and the fault 203 as well as other fault diagnosis information.

Figure 5:
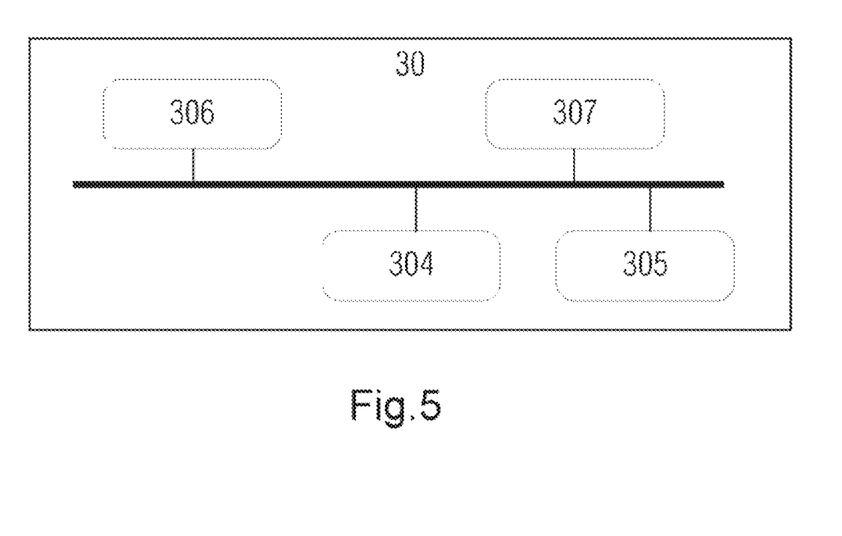
FIG. 5 is another structural schematic diagram of an apparatus for generating a fault diagnosis database provided in an at least one embodiment.

FIG. 5 is another structural schematic diagram of an apparatus provided in at least one embodiment for generating a fault diagnosis database. The apparatus 30 shown in FIG. 5 may be regarded as a form of hardware implementation of the apparatus 30 shown in FIG. 4.

At least one memory 304 is used for storing a machine-readable program, and at least one processor 305 is used for calling the machine-readable program, to perform the method shown in FIG. 2.

The various modules in FIG. 4, i.e. the setting module 301, the running module 302 and the generating module 303, may be regarded as program modules or software modules stored in the memory 304, which perform the method shown in FIG. 2 after being called by the processor 305.

The apparatus 30 shown in FIG. 5 may also comprise a user interface, for interacting with a user, for example: receiving the user's setting of the fault condition 202, semantic descriptions of the fault 203 and the fault phenomenon 204, etc. The apparatus 30 shown in FIG. 5 may also comprise a communication interface 307, for transmitting the fault diagnosis database 201 generated to a fault diagnosis apparatus, e.g. a fault diagnosis apparatus 40 in FIG. 6, for subjecting a CNC machine tool 10 to fault diagnosis.

The apparatuses 30 shown in FIGS. 4 and 5 may be deployed in the cloud, in which case at least one memory 304 may be a memory in the cloud, and at least one processor 305 may be a virtualized processing apparatus in the cloud, e.g. a virtual machine, etc. The fault diagnosis database 201 generated may also be stored in the cloud; storage capacity can be flexibly configured using cloud resources, and distributed storage may also be used when the amount of data is very large.

Figure 6:
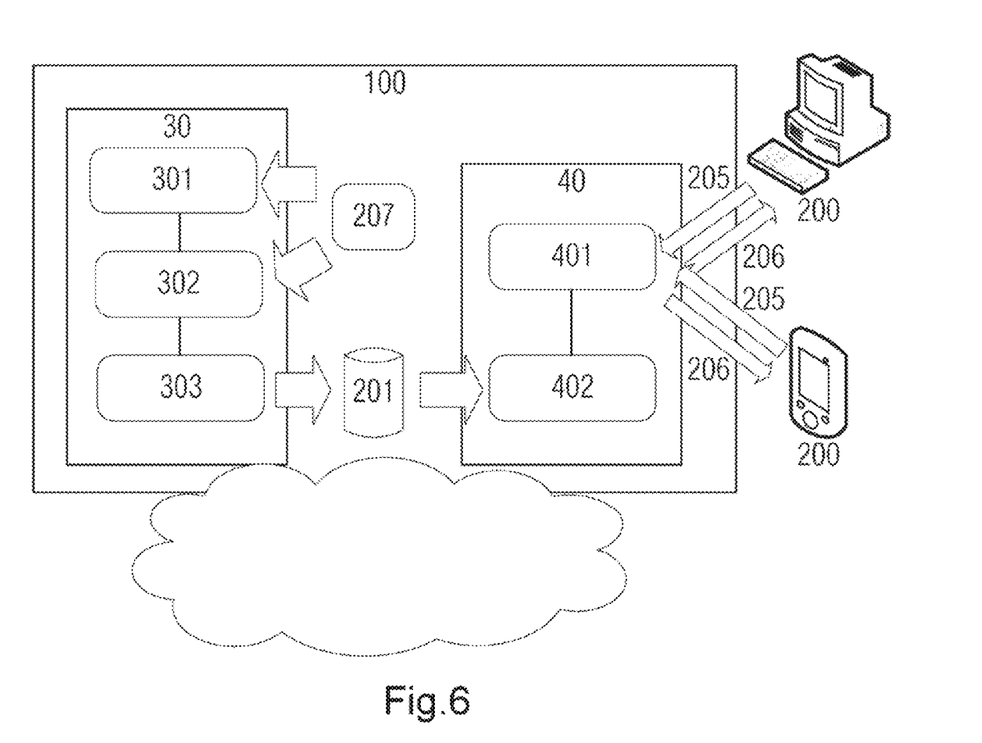
FIG. 6 is a structural schematic diagram of a fault diagnosis system provided in at least one embodiment.

The fault diagnosis database 201 generated according to the abovementioned method or by the abovementioned apparatus 30 may be used to subject a CNC machine tool 10 to fault diagnosis. FIG. 6 is a structural schematic diagram of a fault diagnosis system provided in at least one embodiment. As shown in FIG. 6, the fault diagnosis system 100 comprises: the abovementioned apparatus 30 and a fault diagnosis apparatus 40. Of course, the system 100 may also only comprise a fault diagnosis apparatus 40; when subjecting a CNC machine tool 10 to fault diagnosis, the apparatus 40 may be based on the fault diagnosis database 201 generated in at least one embodiment, and could also be based on another fault diagnosis database, e.g. a fault diagnosis database generated on the basis of a historical fault record and/or expert experience.

As shown in FIG. 6, the apparatus 30 generates a fault diagnosis database 201, and the fault diagnosis apparatus 40 subjects a CNC machine tool 10 to fault diagnosis on the basis of the fault diagnosis database 201. A user interface module 401 in the apparatus 40 may be used to receive information of a semantic description 205 of a fault phenomenon 204 from a user terminal 200, perform fault diagnosis according to the information and on the basis of the fault diagnosis database 201, determine a possible fault 203 capable of generating the fault phenomenon 204, and return a semantic description 206 of the possible fault 203 to the user terminal 200.

Optionally, in an embodiment, the apparatus 40 may perform fault diagnosis using a reasoning method based on a usage example, e.g. using the SimRank++ algorithm, to determine a fault which has arisen, and optionally may also rank possible faults; this ranking may be based on the number of times that the fault-fault phenomenon association occurs, wherein a fault is ranked further forward if the number of times of occurrence is greater. In addition, the Hadoop framework may be used to accelerate the execution of the SimRank++ algorithm.

In addition, the fault diagnosis system 100 may also provide fault statistical information to the user via the user interface module 401, and the user may query statistical information of interest via the interface, for example: the total number of times a fault has arisen in the last month, the length of time taken for the fault diagnosis system to determine a fault, a list of frequently occurring faults, etc.

Once a fault has been resolved, the user may also feed back a result of fault resolution to the fault diagnosis system 100 via the user interface module 401. The result that is fed back may be used to update the abovementioned statistical information.

The fault diagnosis system 100 may be deployed in the cloud, thus the user terminal 200 can conveniently access the fault diagnosis system 100 anywhere at any time in order to perform fault diagnosis. The user terminal 200 may be a personal computer (PC), a mobile terminal or a tablet computer, etc.

In summary, embodiments provide a method and apparatus for generating a fault diagnosis database, and a fault diagnosis system. A simulation model of a CNC machine tool is run under different fault conditions that are set, in order to generate a fault diagnosis database, enabling an abundance of fault diagnosis information to be acquired easily and conveniently. Moreover, since a fault condition is injected into a simulation model, the vast majority of fault situations can be covered, so information is more abundant and comprehensive than in an existing fault diagnosis database generated on the basis of a historical fault record or expert experience. The fault diagnosis database generated may be stored in the cloud in the form of Big Data, making it easy for the fault diagnosis apparatus to acquire information to perform fault diagnosis.

The fault diagnosis system provided in at least one embodiment may be deployed in the cloud, so the user can access the fault diagnosis system anywhere at any time to perform fault diagnosis.

Based on the same technical concept, embodiments also provide a machine-readable medium, on which is stored a machine-readable instruction for causing a machine to perform the method as described above. Specifically, a system or apparatus equipped with the machine-readable medium may be provided, with software program code for realizing a function of any of the above embodiments being stored on the machine-readable medium, and a computer (or central processing unit (CPU) or microprocessor unit (MPU)) of the system or apparatus is caused to read out and execute the program code stored in the storage medium.

In this case, the program code that is read from the storage medium can itself realize a function of any of the above embodiments, therefore the program code and the storage medium storing the program code form a part of embodiments.

Embodiments of storage media used to provide program code include floppy disks, hard disks, magneto-optical disks, optical disks (e.g. Compact Disk Read-Only Memory drive (CD-ROM), Compact Disk-Recordable (CD-R), Compact Disk-ReWritable (CD-RW), Digital Video Disc-Read Only Memory (DVD-ROM), Digital Versatile Disc-Random Access Memory (DVD-RAM), Digital Versatile Disc±ReWritable (DVD±RW), etc.), magnetic tape, non-volatile memory cards and Read-Only Memory (ROM), and cloud storage resources. Optionally, program code may be downloaded from a server computer or the cloud by a communication network.

In addition, it should be clear that a function of any of the above embodiments can be realized not only by executing program code read out by a computer, but also by causing an operating system operating on a computer to complete part or all of an actual operation on the basis of an instruction of the program code.

In addition, it will be understood that program code read out from the storage medium is written into a memory installed in an expansion board inserted in the computer, or written into a memory installed in an expansion unit connected to the computer, and thereafter a CPU etc. installed on the expansion board or expansion unit is caused to execute part or all of an actual operation on the basis of an instruction of the program code, so as to realize a function of any of the above embodiments.

It must be explained that not all of the steps and modules in the flows and device structure diagrams above are necessary; certain steps or modules may be omitted according to actual requirements. The order in which the steps are executed is not fixed, but may be adjusted as required. The device structures described in the embodiments above may be physical structures or logical structures, i.e. some modules might be realized by the same physical entity, or some modules might be realized by multiple physical entities, or may be realized jointly by certain components in multiple independent devices.

In the embodiments above, a hardware unit may be realized in a mechanical or an electrical manner. For example, a hardware unit may comprise a permanent dedicated circuit or logic (e.g. a special processor, FPGA or ASIC) to complete a corresponding operation. A hardware unit may also comprise programmable logic or circuitry (e.g. a universal processor or another programmable processor), and may be set temporarily by software to complete a corresponding operation. Particular embodiments (mechanical, or dedicated permanent circuitry, or temporarily set circuitry) may be determined on the basis of considerations of cost and time.

Example embodiments have been presented and explained in detail above by means of the accompanying drawings and preferred embodiments, but the embodiments are not limited to these disclosed embodiments. Based on the embodiments described above, those skilled in the art will know that further embodiments, also falling within the scope of protection of example embodiments, could be obtained by combining code checking means in different embodiments above.

The invention claimed is:

1. A method for generating a fault diagnosis database of a CNC (Computer Numerical Control) machine tool, comprising:
   setting at least one fault condition of the CNC machine tool;
   running a first simulation model of the CNC machine tool under each set fault condition respectively to generate a fault, and recording at least one fault phenomenon of the fault;
   for each fault phenomenon recorded, backtracking at least one possible fault generating the fault phenomenon, to establish at least one association between the fault phenomenon and at least one possible fault generating the fault phenomenon including establishing a reverse fault propagation path of the fault phenomenon; and
   generating a first fault diagnosis database of the CNC machine tool according to the at least one association established, the generating including,
      generating a fault propagation model as the first fault diagnosis database according to the established reverse fault propagation path of the at least one fault phenomenon.

2. The method as claimed in claim 1, wherein the at least one fault condition satisfies one of the following situations:
   the at least one fault condition involves all components of the CNC machine tool, and each of the at least one fault condition only involves one component of the CNC machine tool; and
   the at least one fault condition involves all components of the CNC machine tool, and each of a portion of or all of the at least one fault condition involves at least two components of the CNC machine tool.

3. The method as claimed in claim 1, further comprising:
   setting a semantic description of each fault phenomenon and recording same in the first fault diagnosis database, and
   setting a semantic description of each fault and recording same in the first fault diagnosis database.

4. The method as claimed in claim 1, further comprising:
   running a second simulation model of the CNC machine tool under each of the at least one set fault condition respectively to generate a second fault diagnosis database; and
   using the second fault diagnosis database to correct the first fault diagnosis database.

5. An apparatus for generating a fault diagnosis database of a CNC machine tool, comprising:
   at least one memory for storing a machine-readable program; and
   at least one processor, for calling the machine-readable program, to perform the following steps:
      setting at least one fault condition of the CNC machine tool,
      running a first simulation model of the CNC machine tool under each set fault condition respectively to generate a fault, and recording at least one fault phenomenon of the fault,
      for each fault phenomenon recorded, backtracking at least one possible fault generating the fault phenomenon, to establish at least one association between the fault phenomenon and at least one possible fault generating the fault phenomenon, and
      generating a first fault diagnosis database of the CNC machine tool according to the at least one association established, wherein
      when calling the machine-readable program to establish the at least one association between the fault phenomenon and the at least one possible fault generating the fault phenomenon, the at least one processor is configured to establish a reverse fault propagation path of the fault phenomenon, and
      when calling the machine-readable program to generate the first fault diagnosis database according to the at least one association established, the at least one processor is configured to generate a fault propagation model as the first fault diagnosis database according to the established reverse fault propagation path of the at least one fault phenomenon.

6. The apparatus as claimed in claim 5, wherein the at least one fault condition satisfies one of the following situations:
- the at least one fault condition involves all components of the CNC machine tool, and each of the at least one fault condition only involves one component of the CNC machine tool; and
- the at least one fault condition involves all components of the CNC machine tool, and each of a portion of or all of the at least one fault condition involves at least two components of the CNC machine tool.

7. The apparatus as claimed in claim 5, wherein when calling the machine-readable program, the at least one processor is further configured to perform:
- setting a semantic description of each fault phenomenon and record same in the first fault diagnosis database, and
- setting a semantic description of each fault and record same in the first fault diagnosis database.

8. The apparatus as claimed in claim 5, wherein
when calling the machine-readable program, the at least one processor is further configured to perform:
- running a second simulation model of the CNC machine tool under each of the at least one set fault condition respectively to generate a second fault diagnosis database; and
- using the second fault diagnosis database to correct the first fault diagnosis database.

9. A machine-readable medium having a machine-readable instruction stored thereon which, when executed by at least one processor, causes the at least one processor to perform:
- setting at least one fault condition of a CNC (Computer Numerical Control) machine tool;
- running a first simulation model of the CNC machine tool under each set fault condition respectively to generate a fault, and recording at least one fault phenomenon of the fault;
- for each fault phenomenon recorded, backtracking at least one possible fault generating the fault phenomenon, to establish at least one association between the fault phenomenon and at least one possible fault generating the fault phenomenon including establishing a reverse fault propagation path of the fault phenomenon; and
- generating a first fault diagnosis database of the CNC machine tool according to the at least one association established, the generating including,
  - generating a fault propagation model as the first fault diagnosis database according to the established reverse fault propagation path of the at least one fault phenomenon.

10. The machine-readable medium as claimed in claim 9, wherein the at least one fault condition satisfies one of the following situations:
- the at least one fault condition involves all components of the CNC machine tool, and each of the at least one fault condition only involves one component of the CNC machine tool; and
- the at least one fault condition involves all components of the CNC machine tool, and each of a portion of or all of the at least one fault condition involves at least two components of the CNC machine tool.

11. The machine-readable medium as claimed in claim 9, having the machine-readable instruction stored thereon which, when executed by the at least one processor, causes the at least one processor to perform:
- setting a semantic description of each fault phenomenon and recording same in the first fault diagnosis database, and
- setting a semantic description of each fault and recording same in the first fault diagnosis database.

12. The machine-readable medium as claimed in claim 9, having the machine-readable instruction stored thereon which, when executed by the at least one processor, causes the at least one processor to perform:
- running a second simulation model of the CNC machine tool under each of the at least one set fault condition respectively to generate a second fault diagnosis database; and
- using the second fault diagnosis database to correct the first fault diagnosis database.

\* \* \* \* \*